Aug. 11, 1953
R. S. CARROLL
2,648,173
APPARATUS FOR FINISHING HARDENED SURFACES
ON FRAMES FOR POWER SAWS
Filed March 7, 1952
2 Sheets-Sheet 1
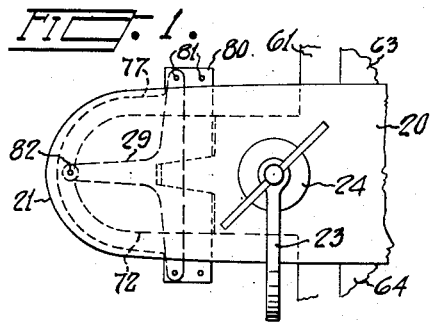
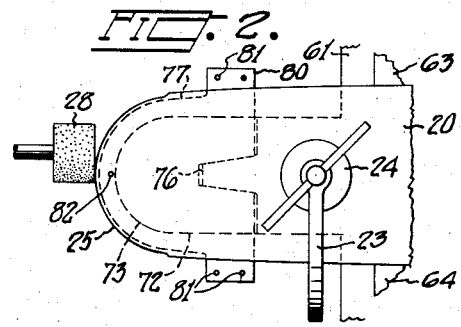
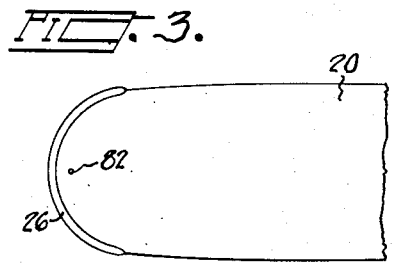
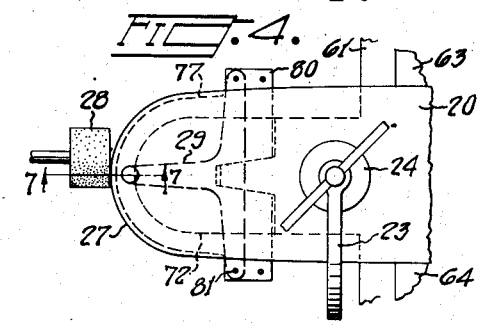
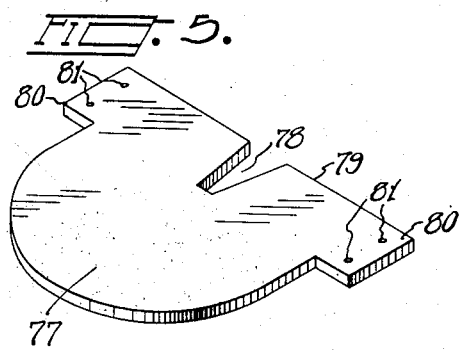
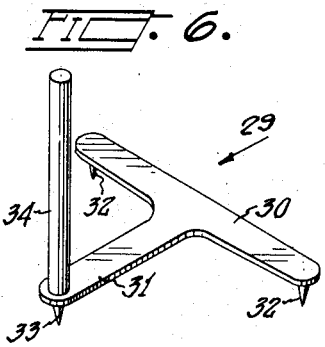
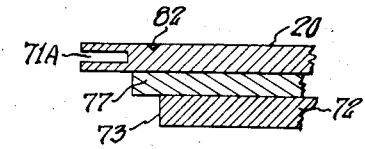
INVENTOR
RALEIGH S. CARROLL
BY
ATTORNEY

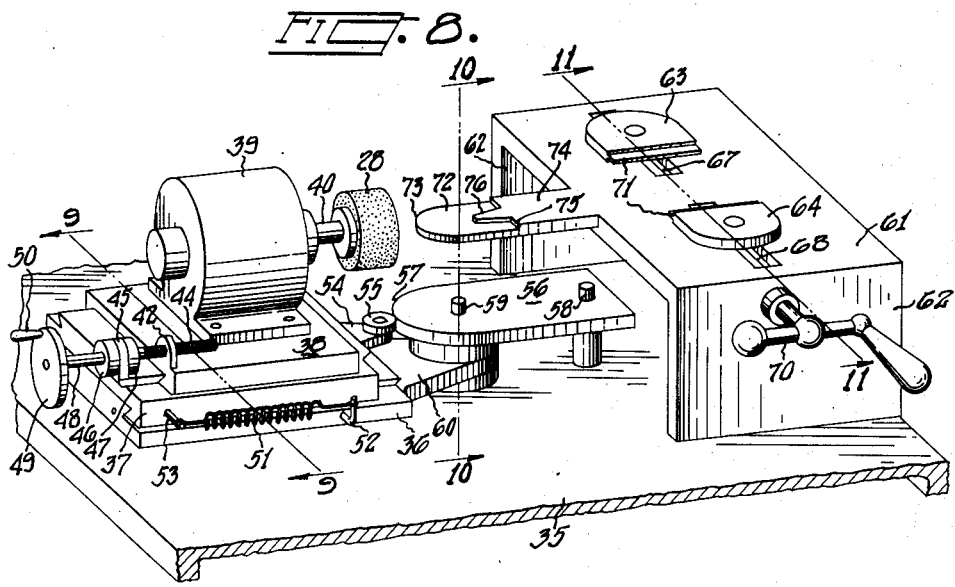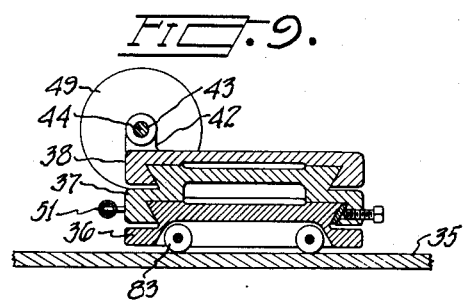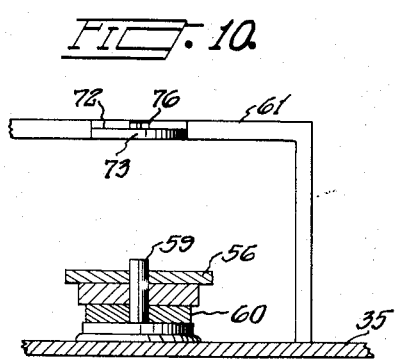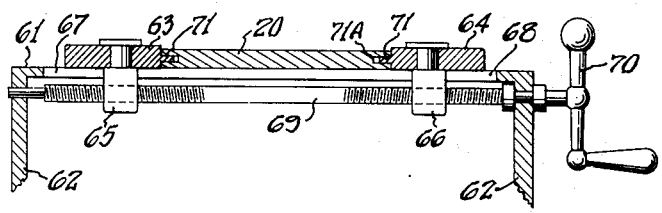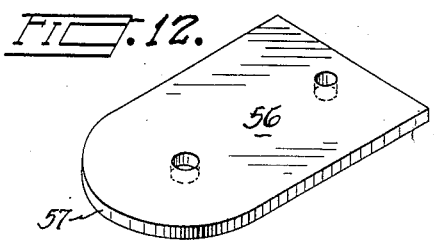

Patented Aug. 11, 1953

2,648,173

UNITED STATES PATENT OFFICE 2,648,173

APPARATUS FOR FINISHING HARDENED SURFACES ON FRAMES FOR POWER SAWS

Raleigh S. Carroll, Portland, Oreg., assignor to William Flett, Portland, Oreg.

Application March 7, 1952, Serial No. 275,353

3 Claims. (Cl. 51—55)

This invention relates generally to power saws and particularly to an apparatus for finishing hardened surfaces on frames for power saws.

The main object of this invention is to provide a jig for grinding hardened surfaces on the ends of a power saw bar.

The second object is to provide an apparatus which will perform the grinding operation with the utmost precision and smoothness of finish in order to add to the life of the chain passing over the saw as well as adding to the life of the frame itself.

The third object is to so construct the apparatus that it can be adjusted for various saw frame curves as well as to regulate the depth of the grinding line below the finish line and along the finish line.

These and other objects are accomplished in the manner set forth in the following specifications as illustrated in the accompanying drawings, in which:

Fig. 1 is a plan of a worn blade or frame.

Fig. 2 is a plan of the blade showing a rough grind.

Fig. 3 is a view showing the blade with the hardened surface applied.

Fig. 4 is a view showing the saw frame replaced in the grinder and undergoing a finish grind.

Fig. 5 is a perspective view of the upper templet, the main function of which is to set the worn blade in the grinder.

Fig. 6 is a perspective view of the spider for marking the blade so that it can be removed and replaced in the same location.

Fig. 7 is a section through the blade, taken along the line 7—7 in Fig. 4.

Fig. 8 is a perspective view of the grinding machine.

Fig. 9 is a section taken along the line 9—9 in Fig. 8.

Fig. 10 is a section taken along the line 10—10 in Fig. 8.

Fig. 11 is a section taken along the line 11—11 in Fig. 8.

Fig. 12 is a perspective view of the lower templet which controls the grinding.

Like numbers of reference refer to the same or similar parts throughout the several views.

Referring in detail to the drawing, there is shown in Fig. 1 a portion of a frame or blade 20 of a power saw whose rounded end 21 has become worn or roughened by use, and showing the blade 20 held between the clamps 63 and 64 and held down by a C clamp 23, which bears against the saw engaging jaw 24.

In Fig. 2, the rounded edge 25 has been ground to make room for the hardened material which is to be built up thereon.

In Fig. 3, the hardened material 26 is shown in place and extending outside of the true finish line 27 shown in Fig. 4.

The position of the grinding wheel 28 is also indicated.

In Fig. 6 is shown a spider 29 comprising a cross bar 30 and the laterally projecting center bar 31. The bar 30 has two downturned points 32 thereunder, while the bar 31 has the center punch 33, which is the lower end of a striking bar 34. The purpose of this spider is for insuring the blade or frame being set in the machine in the same manner every time.

Referring to the entire apparatus, the same will be seen to include a base 35, upon which is secured a dove-tailed guide 36 upon which is mounted a cross head 37 upon which is mounted a motor slide 38 upon which rests a motor 39 on whose shaft 40 is mounted a grinding wheel 28. On the slide 38 is formed a lug 42 having a threaded opening 43 into which is threaded a screw 44 which journals in the bearing 45 on the cross head 37.

Collars 46 and 47 are secured on the stem 48 of the screw 44 on opposite sides of the bearing 45.

A hand wheel 49 is secured on the stem 48 and is provided with a handle 50 by means of which the wheel 49 can be turned and the motor 39 moved longitudinally with relation to the guide 36. A tension spring 51 is attached to the guide 36 by means of a pin 52 and to the cross head 37 by means of a pin 53.

The slide 38 is provided with a horizontally projecting arm 54 on which is mounted a roller 55. In the plane of the roller 55 is mounted the lower templet 56 whose end 57 is the desired shape of the saw frame curve and serves as a cam for determining the grinding action. The lower templet 56 rests upon the pilot pins 58 and 59, the former of which is mounted on the base 35 and the latter mounted on the arm 60 which projects from the guide 36.

Mounted on the base 35 is a table 61 which is supported over the base 35 by means of the legs 62. The table 61 has secured thereon a pair of sliding jaws 63 and 64, attached to which are the downturned posts 65 and 66, which are mounted in the slots 67 and 68 in the table 61. Extending through the posts 65 and 66 and journalling in the legs 62 is an elongated screw 69 having right and left-hand threads which are threaded through the posts 65 and 66.

A handle 70 on the screw 69, by turning the screw 69, moves the jaws 63 and 64 in opposite directions. The jaws 63 and 64 are preferably provided with tongues 71 which engage the grooves 71-A in the member 20.

Projecting from the table 61 in the direction of the grinding wheel 28 is a support 72 having a rounded edge 73 and having a plate 74 on the top side thereof forming a shoulder 75 in the middle of which is disposed a tapering lug 76.

In Fig. 5 is shown a perspective view of the upper templet 77 having a tapering notch 78 adapted to receive the lug 76 while the face 79 does not engage the shoulder 75. The templet 77 is provided with a pair of lateral ears 80, in each of which are the countersunk holes 81, the holes 81 on opposite sides of the center line of the templet 77.

The operation of the device is as follows: Assuming that a saw bar or blade 20 has become worn on its rounded end 21, an upper templet 77 corresponding with the particular saw frame being handled is now put in place on the support 72. The blade is then laid upon the table 61 between the vise jaws 63 and 64 with the tongues 71 occupying the grooves 71-A and the rounded end 21 concentric with the rounded portion of the upper templet 77. The spider 29 is now mounted with its points 32 in either of the holes 81, which will leave the point 33 fairly close to the rounded edge 21.

The bar 34 is now struck with a hammer and its point 33 leaves a mark 82 in the end of the blade 20, by means of which it can be properly positioned in the identical place for a following operation. Having been thus positioned, the guide 36 is swung around on the axis of the pin 59, the weight of the guide 36 and its attached parts being borne by the rollers 83 and the grinding wheel 28 is brought up to the work by the hand wheel 49. Since the roller 55 traces the curvature of the cam or templet 56, it follows that the grinding wheel 28 will follow the same course due to the fact that the slide 38 is connected to the roller 55.

As stated, the first operation is to cut away the edges of the blade 20 to the line 25, as shown in Fig. 2, by merely swinging the wheel around the end of the blade. The blade 20 is now removed from the table 61 and a layer 26 of suitable hardened material is deposited in excess of the desired amount to provide material for finishing, as shown in Fig. 3. The blade 20 is now returned to the jig and its former position assured by means of the spider 29, after which a finishing cut is taken in the hardened material to produce the new surface 27, as shown in Fig. 4.

Should any burr exist in the slot 71-A it is removed by a wafer grinding disk.

It can thus be seen that by this relatively simple jig, the shape of the saw frame can be maintained at all times and, when it is necessary to replace it with a hardened surface, this can be done without departing in any way from its correct shape.

For the sake of convenience, the guide 36 is referred to as a swing arm.

I claim:

1. An apparatus for finishing hardened surfaces on frames for power saws, comprising a base, a table mounted over said base having a pair of opposed sliding jaws mounted thereon adapted to engage the grooves in the opposite sides of a saw frame, a support extending from said table, an upper templet mounted on said support having a portion thereof curved to conform to the desired curvature on the saw frame and having means for holding said templet in accurate relation to said table, said templet having a pair of countersunk holes on the opposite sides of the center thereof, a lower templet under said upper templet having a pivot pin along the axis of curvature of said upper templet, a swing arm centered on said pivot pin and capable of moving on said table in arcuate fashion, a slide guiding on said swing arm, a screw feed for said slide, a motor driven wheel mounted on said slide, a roller on said slide engaging said lower templet and a spring for urging said slide toward said templet.

2. An apparatus for finishing hardened surfaces on frames for power saws comprising a base, means for holding a power saw frame over said base, a lower templet conforming to the curvature of the finished end of the saw frame and concentric therewith, a swing arm resting on said base and pivotally held along the axis of said lower templet, a grinder slidably mounted on said swing arm, an upper templet having spaced countersunk holes therein, and a roller disposed between said grinder and the rounded end of said lower templet.

3. In a device of the class described, the combination of a base, a pivot pin erected on said base constituting an axis of grinding, a swing arm resting on said base pivoted on said pin, a slide mounted on said arm having a roller thereon, a grinder mounted on said slide, a lower templet consisting of a plate having one end thereof rounded to conform to the shape of an end of a power saw frame and engaging said roller, a spring for urging said roller into engagement with said templet, a table mounted over said base having clamping jaws thereon for holding a saw frame in a grinding position, an upper templet interchangeably mounted on said table having means for accurately positioning same with relation to said table, said upper templet having countersunk holes on opposite sides thereof, and means for controlling the depth of the grinding cut.

RALEIGH S. CARROLL.

References Cited in the file of this patent

UNITED STATES PATENTS

| Number | Name | Date |
| --- | --- | --- |
| 646,397 | Bancroft et al. | Mar. 27, 1900 |
| 2,290,051 | Hinkley et al. | July 14, 1942 |
| 2,419,529 | Braaten | Apr. 29, 1947 |
| 2,548,418 | Bernheim et al. | Apr. 10, 1951 |